United States Patent [19]
Usifer et al.

[11] Patent Number: 5,360,543
[45] Date of Patent: Nov. 1, 1994

[54] POLYURETHANE COMPOSITIONS

[75] Inventors: Douglas A. Usifer, Belle Mead; Carlos Ramirez, Piscataway, both of N.J.

[73] Assignee: Caschem, Inc., Bayonne, N.J.

[21] Appl. No.: 893,995

[22] Filed: Jun. 5, 1992

[51] Int. Cl.$^5$ ............................................. B01D 63/02
[52] U.S. Cl. ........................... 210/321.8; 210/321.89; 210/500.23
[58] Field of Search ............. 210/493.5, 321.87, 321.8, 210/321.89, 321.61, 500.28, 500.23; 528/52; 156/331.4

[56] References Cited

U.S. PATENT DOCUMENTS

| | | | |
|---|---|---|---|
| 2,956,031 | 10/1960 | Khawam | 260/2.5 |
| 3,362,911 | 1/1968 | Byers et al. | 252/79.2 |
| 3,362,921 | 1/1968 | Ehrlich et al. | 260/18 |
| 3,483,150 | 12/1969 | Ehrlich et al. | 260/18 |
| 3,962,094 | 6/1976 | Davis et al. | 210/321 R |
| 4,134,216 | 7/1977 | Jansen et al. | 528/52 X |
| 4,847,307 | 7/1989 | Dewhurst et al. | 521/110 |
| 4,865,735 | 9/1989 | Chu et al. | 210/321.61 |
| 4,876,308 | 10/1989 | Melby et al. | 156/331.4 X |

FOREIGN PATENT DOCUMENTS

| | | |
|---|---|---|
| 0329474A3 | 8/1989 | European Pat. Off. . |
| 0329474A2 | 8/1989 | European Pat. Off. . |
| 0383596A1 | 8/1990 | European Pat. Off. . |

*Primary Examiner*—Frank Spear
*Attorney, Agent, or Firm*—Pennie & Edmonds

[57] ABSTRACT

The invention relates to polyurethane compositions that can be formulated as a two component systems of a first component of a polyol and an amine of formula (I):

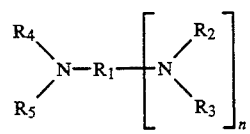

and a second component of isocyanate. This invention further relates to methods of formulating those polyurethanes, and to use of those polyurethanes in separatory devices.

21 Claims, No Drawings

POLYURETHANE COMPOSITIONS

TECHNICAL FIELD

The invention relates to polyurethanes, particularly polyurethanes useful as potting and sealing compounds for biomedical devices.

BACKGROUND OF THE INVENTION

Polyurethane compositions based on the reaction product of a polyol and a polyisocyanate cured with one or more polyfunctional crosslinking agents have been described in the art. In particular, polyurethanes based on prepolymers comprising the reaction product of long chain fatty acid esters such as castor oil with organic polyisocyanates have been described. For example, U.S. Pat. No. 3,362,921 shows prepolymers based on the reaction product of active hydrogen-containing compounds such as castor oil, polyester amides and polyalkylene ether glycols with organic diisocyanates. Curing agents employed with these prepolymers are esters of polyhydric alcohols which contain at least four hydroxy groups and an aliphatic acid of at least 12 carbon atoms and one or more hydroxy and/or epoxy groups. The cured polyurethanes of U.S. Pat. No. 3,362,911 find use as flocking adhesives, paper coatings, potting compositions and encapsulating compounds for electronic parts.

U.S. Pat. No. 3,483,150 also discloses prepolymer compositions. These compositions are the reaction product of at least one polyfunctional compound that contains active hydrogens with an arylene diisocyanate, and a low viscosity or solid polyfunctional isocyanate derived from the reaction of aniline and a formaldehyde. The prepolymers are cured to elastomers by employing at least one curing agent that contains two or more active hydrogen groups. Such curing agents include the curing agent of U.S. Pat. No. 3,362,921 and in addition, a glycol, glycerol, polyglycol, or polyalkylene glycol mono- or di-ester of a hydroxy carboxylic acid having at least 12 carbon atoms. Amines such as primary and secondary aliphatic, cyclic, aromatic, aralkyl and alkaryl diamines are useful in curing these prepolymers.

Cured polyurethanes have found use in hollow fiber separatory devices. U.S. Pat. No. 3,962,094 shows a hollow fiber separatory device useful for dialysis, ultrafiltration, reverse osmosis, hemodialysis, etc. This device consists of a plurality of fine, hollow fibers whose end portions are potted in a tube sheet and whose open fiber ends terminate in a tube sheet face which provides liquid access to the interior of the fibers. The tube sheet comprises a cured polyurethane consisting essentially of a prepolymer based on the reaction product of castor oil with at least one mole per castor oil of an organic diisocyanate and cross-linked with either castor oil or an ester of a polyhydric alcohol having a hydroxyl functionality of 4 or more, and an organic acid containing at least 12 carbon atoms and one or more hydroxy and/or epoxy groups per molecule, or mixtures of castor oil and the such esters.

In addition to separatory devices, cured polyurethanes also have been employed in folded membrane separatory devices for use in chemical separations such as dialysis, osmotic processes and hemodialysis. In a folded membrane device such as an artificial kidney, a membrane sheet is multiply-folded or pleated to form a series of adjacent channels, each channel located between opposed faces of each fold. The edges of the folds in the membrane are sealed together by potting the edges with a sealant. The membrane then is placed in a container such as polystyrene, a styrene-acrylonitrile copolymer or a polycarbonate polymer wherein the chemical separation takes place. In the case of dialysis, the dialysis solution is placed on one side of the membrane and blood is placed on the other side.

Polyurethane compositions which contain a polyol also are shown in U.S. Pat. No. 4,865,735. The polyurethanes of U.S. Pat. No. 4,865,735 are formed as the reaction product of an organic isocyanate, and a polyol of a carboxylic acid that has at least 8 carbon atoms. The urethanes of U.S. Pat. No. 4,865,735, although useful as potting materials, must be formulated as three part systems because the amine may cause the polyol to become unstable. Formulating three part polyurethanes, however, is both inefficient and expensive.

The three part polyurethane systems of the prior art, although useful as potting compounds such as for hollow fibers and folded membrane separatory devices, have additional drawbacks after the amine and polyol components have been mixed in preparation for urethane formation. The polyol becomes unstable, and potting results in inferior sealant performance. This performance problem can usually result in the failure of the separation device.

A need therefor exists for polyurethanes which may be employed as potting compounds and the like, such as in the manufacture of hollow fiber separation devices, but which avoid the requirement to formulate polyurethanes as three part systems.

SUMMARY OF THE INVENTION

In accordance with the invention, a two component composition for producing polyurethanes is provided. The first component is formed from a non-amine hydroxy-functional organic material such as a polyol, most preferably castor oil, and an amine most preferably a tertiary amine, of formula (I):

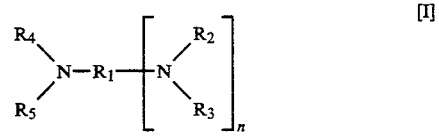

wherein:
$R_1 = C_1-C_{10}$ alkyl
$R_4 = C_8-C_{25}$ alkyl,
$r_2$, $R_3$, and $R_5$ independently are
$C_1-C_{10}$ alkanol, $C_2-C_{10}$ alkenol, and n=1 or 2.

The second component of the two component composition includes an organic isocyanate.

Preferably, the amine of formula (I) is .1 to 10 most preferably 3%, of the first component. Preferably, in the amines of formula (I), $R_1 = C_1-C_8$ alkyl, most preferably $C_3$ alkyl; $R_4 = C_{10}-C_{20}$ alkyl, most preferably $C_{18}$ alkyl; $R_2$, $R_3$ and $R_5$ are preferably, but independently $CH_3CH_2OH$, and n is preferably 1.

The polyurethanes are useful as potting compounds and sealants in devices such as hollow fiber or folded membrane devices.

DETAILED DESCRIPTION OF THE PREFERRED EMBODIMENTS

The first component of polyol and the amine of formula (I) can be formed by well known procedures such as by mixing of the polyol and amine.

The polyols which may be used according to the invention include esters of carboxylic acids having at least 8 carbon atoms, such esters being liquid at ambient temperature, and have a hydroxyl functionality of at least 2. To obtain desirable esters, the carboxylic acid generally contains less than about 25 carbon atoms, preferably between 12 to 20 carbon atoms. Hydroxyl functionality as used herein is the average number of hydroxyl groups per molecule of ester compound.

These hydroxyl bearing esters include esters of ricinoleic acid with polyhydric alcohols which form a polyricinoleate compound or a combination of polyricinoleate compounds having a hydroxyl functionality of 2 or more and an equivalent weight of between about 60 and 400. Such compounds include various di, tri and tetraricinoleate compounds alone, mixed together, or combined with other polyols provided that the equivalent weight of the mixture or combination is maintained within the range stated above.

As stated, these hydroxyl esters preferably are ricinoleic acid polyol esters and more preferably castor oil. Castor oil is a naturally occurring triglyceride of ricinoleic acid. Castor oil is actually a mixture of mono-, di-, and triglycerides and has an average hydroxyl functionality of 2.7. Other ricinoleic acid polyol esters include glycol, polyglycol and other polyhydric alcohol mono-, di-, and polyesters of ricinoleic acid. These ricinoleic acid polyol esters can be made by methods well known in the art, e.g., by direct esterification of ricinoleic acid with alcohols such as ethylene glycol, glycerine, propylene glycol, hexylene glycol, diethylene glycol, dipropylene glycol, hexamethylene glycol, polyethylene and polyethylene and polypropylene glycols, sucroce or sorbitol.

Specific ricinoleate ester compounds include ethylene glycol mono-, di-ricinoleates, propyl mono-and diricinoleates, penta erythritol mono-, di, tri-, tetra- and penta-ricinoleates, glycerol ricinoleate, 1,4-cyclohexane dimethanol mono- and di-ricinoleate, butane diol diricinoleate, neopentyl glycol mono- and di- ricinoleates, and mono- or di-ricinoleates of N,N-bis (2-hydroxy propyl) aniline or N,N,N,$^1$N$^1$-tetrakis (2-hydroxy propyl) ethylene diamine. Examples of polyols which may be used in the invention include penta erythritol mono ricinoleate, glycerol ricinoleate, propyl mono ricinoleate, penta erythritol tri ricinoleate, and 1,4 cyclohexanedimethanol di ricinoleate.

A second group of hydroxyl bearing components which are suitable in the compositions of this invention include one or more polyether polyols having a functionality of at least 2 and an equivalent weight between about 30 and 185. As the polyol component, the polyether polyol can form up to 25% by weight of the ricinoleate esters.

The preferred polyether polyols are polyether diols, and more particularly polyoxypropylene diols. Generally, these polyether diols are prepared by condensing a large excess of an alkylene oxide, such as ethylene oxide or propylene oxide with a glycol, as is well known in the art. The glycol can be a diol such as alkylene glycols, e.g., ethylene glycol or propylene glycol, a triol such as glycerine, a tetrol such as pentaerythritol, etc.

Particularly preferred polyols for this invention comprise polyoxypropylene triols, having an equivalent weight of between about 30 and 185.

The organic polyisocyanates which are suitable for use in this invention include any isocyanate or polyisocyanate compound, including mono or diisocyanates, preferably diisocyanates. Preferably, the organic polyisocyanates have 2 or more NCO groups per molecule but no other substituents capable of reacting with the hydroxyl groups of the polyol. Aliphatic polyisocyanates, preferably diisocyanates, cycloaliphatic polyisocyanates, and aromatic polyisocyanates therefor may be employed. Examples of isocyonates which may be used in the invention include hydrogenated methylene diphenyl diisocyanate ("MDI"), N-oleyl-1,3 diamine propane.

The diisocyanates which may be used in this invention include: arylene diisocyanates, represented by the diisocyanates of the benzene and naphthalene series, or mixtures of these compounds. Illustrative of such arylene diisocyanates are toluene diisocyanate (TDI) (2,4/2,6); toluene 2,4-diisocyanate; toluene 2,6-diisocyanate; m-phenylene diisocyanate; toluene 2,6-diisocyanate; m-phenylene diisocyanate, xenylene 4,4-diisocyanate; naphthalene 1,5 diisocyanate; 3,3-bitolylene 4,4 diisocyanate; diphenylene methane 4,4diisocyanate (MDI); 4-chlorophenylene 2,4diisocyanate; dianisidine diisocyanate, diphenylene ether 4,4-diisocyanate and polymeric isocyanates such as polymethylene polyphenylene isocyanate. Other arylene diisocyanates which are useful in the invention include lower alkyl and alkoxy-substituted derivatives. Aliphatic and cycloaliphatic diisocyanates, such as isophone diisocyanate (IPDI), also can be employed. Mixtures of arylene and aliphatic or cycloaliphatic diisocyanates also can be used in compositions of this invention. Isocyanate adducts such as modified MDI trimers, TMP-TDI adducts and biurets of hexamethylene diisocyanate can also be used. Isocyanates which are most preferred are mixtures of aliphatic, multifunctional isocyanates, especially preferred is the mixture of isocyanates sold under the tradename Vorite 1790 from Cas Chem Co.

The amines suitable for use in the invention include mono amines, polyamines, or mixtures thereof having an equivalent weight of 30–4000. These amines have the general formula (I):

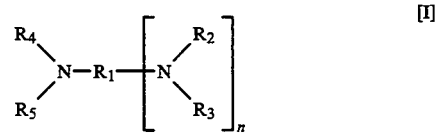

wherein
$R_1 = C_1-C_{10}$ alkyl,
$R_4 = C_8-C_{25}$ alkyl,
$R_2$, $R_3$, and $R_5$ are independently
$C_1-C_{10}$ alkanols, or $C_2-C_{10}$ alkenols, and
$n = 1$ or 2.

Preferably, the amine of formula (I) is 0.1 to 10%, most preferably 3%, of the first component. Preferably, in the amines of formula (I), $R_1 = C_1-C_8$ alkyl, most preferably $C_3$ alkyl; $R_4 = C_{10}-C_{20}$ alkyl, most preferably $C_{18}$ alkyl; $R_2$, $R_3$ and $R_5$ are preferably, but independently $CH_3CH_2OH$, and n is preferably 1. The amine may be either solid or liquid, preferably liquid at room temperature.

These amines are commercially available from for example, AKZO Co. and BASF Co. The amine can form up to 30% by weight of the first component of polyol, preferably 1-5% by weight, most preferably 3% by weight. The amine should comprise up to 15% by weight of the Polyol-Isocyanate composition, i.e., 0.2-16% by equivalent of the finished composition depending upon the amine and the specific polyol and isocyanate compounds utilized. If desired, the amine can be prereacted with the above isocyanate as part of the isocyanate portion. As is well known by one skilled in the art, equivalents for each component in the composition can be calculated by determining the actual weight (in parts) of each component, and by dividing this weight by the equivalent weight of the component, to determine the amount of equivalents for each component. Then, the amount of equivalents for the amine component, divided by the total amount of equivalents for all components, (then multiplied by 100%) provides the equivalents percent of amine in the compositions.

The amount of organic polyisocyanate compound reacted with the hydroxyl group of the polyol component is sufficient to provide between 1 and 1.4 mole, preferably between about 1 to 1.1 mole, of isocyanate per each hydroxyl group. For urethane prepolymer formation, an NCO/OH ratio above about 2.1, preferably about 3:1 up to about 7:1 or more is desirable. The most preferred range is between about 4:1-5:1 to insure the formation of an isocyanate-terminated urethane prepolymer that is capable of further reaction with the polyol component.

EXAMPLES

The scope of the invention is further described in connection with the following examples which are set forth for the sole purpose of illustrating various embodiments of the invention, and which are not to be construed as limiting the scope of the invention in any manner. In these examples, all parts given are by weight unless otherwise specified.

Generally, in the following examples, the urethane prepolymer compositions are prepared as follows:

Blends of carboxylic acid derivatives are mixed with an amine of formula (I) and an optional catalyst to provide a first polyol component. This first component is mixed with a second component of an isocyanate such as a diisocyanate at a temperature of 35° C. After mixing, the temperature is raised to 60°-70° C. The resulting urethane prepolymer may be diluted with a polyisocyanate monomer, such as Desmodur W, a hydrogenated MDI available from Mobay Chemical Co.

Examples 1-6

Blends of derivatives of castor oil and ricinoleic acid, and an amine of Formula I, are mixed to form the first component of Polyol. A second component of TDI is mixed with the first component. These mixtures are listed in the table below.

| | PARTS BY WEIGHT | | | | | |
|---|---|---|---|---|---|---|
| | Example | | | | | |
| | 1 | 2 | 3 | 4 | 5 | 6 |
| Component 1 | | | | | | |
| castor oil[2] | 72 | 75 | 85 | 80 | 73 | 82 |
| Amine[1,2] | 28 | 25 | 15 | | | |
| BDDR[3] | | | 30 | | 20 | 27 |
| 1,4 CHDMDR[4] | | | | 18 | | |
| Equivalent Weight Component 2 | 198 | 209 | 216 | 181 | 198 | 189 |
| TDI[5] | 30 | 40 | 50 | 60 | 20 | 10 |

[1]Amine of formula (I) where $R_1 = C_3H_8$; $R_2$; $R_3$; and $R_5$ are $CH_3CH_2OH$; $R_4 = C_{18}H_{38}$; $R_5 = C_5H_{11}OH$; and n = 1.
[2]Percentages given as percentages of component 1
[3]Butane diol diricinoleate
[4]1,4 - cyclohexane dimethanol diricinoleate
[5]Percentage of TDI given as percentage of total of first and second components. Remainder is first component.

For each of the above formulations of component 1, 0.1% of dioctyl tin diricinoleate catalyst is utilized.

The ricinoleate blends of component 1 preferably have an equivalent weight of less than about 200 and a hardness of more than about 50 Shore D depending upon the ricinoleate used. Isocyanates other than TDI may be used so that higher equivalent weight ricinoleate blends (i.e., up to 275) may be used.

Examples 7-13

A polyol first component is formed from a mixture of castor oil or ricinoleic acid derivatives and an amine of Formula I. A isocyanate, second component formed from tetramethyl xylene diisocyanate (TMXDI) is mixed with the first component isocyanate.

| | Weight Percentage | | | | | | |
|---|---|---|---|---|---|---|---|
| | Example | | | | | | |
| | 7 | 8 | 9 | 10 | 11 | 12 | 13 |
| Component 1 | | | | | | | |
| amine[1,2] | 5 | 2 | 5 | 3 | 2 | 39 | 32 |
| Castor Oil[2] | 95 | 98 | | | | | |
| BDDR[3] | | | 95 | 97 | 98 | | |
| 1,4 CHDMDR[4] | | | | | | 61 | 68 |
| Equivalent Weight Component 2 | 337 | 340 | 228 | 247 | 266 | 255 | 271 |
| TMXDI | 30 | 40 | 50 | 60 | 10 | 20 | 15 |

[1]Amine of formula (I) where $R_1 = C_5H_{12}$, $R_2$, $R_3$, and $R_5$ are $CH_5H_{11}OH$, $R_4 = C_8H_{18}$, n = 2.
[2]Percentages given as percentages of component 1
[3]Butane diol diricinoleate
[4]1,4 - cyclohexane dimethanol diricinoleate
[5]Percentage of TMXDI given as percentage of total of first and second components. Remainder is first component.

For each example, an appropriate amount of a catalyst such as dioctyl tin diricinoleate is utilized. The first component of ricinoleate polyol and amine has an equivalent weight of less than about 275.

To illustrate the surprising improvements achieved by the two component systems of the following additional Example is provided.

Example

The polyol first component and the isocyanate second component are formulated as given below:

| Ingredient | Weight % of Total Composition |
|---|---|
| POLYOL FIRST COMPONENT | |
| Castor Oil | 24 |
| Polycin ®12[1] | 29 |
| T-13 Amine[2] | 1.577 |
| Catalyst C1707[3] | 0.157 |
| ISOCYANATE SECOND COMPONENT | |

| Ingredient | Weight % of Total Composition |
| --- | --- |
| Vorite ® 1790[4] | 46.04 |

[1]Pentaerythritol monoricinoleate
[2]Ethoduomeen T-13, available from AKZO Co.
[3]Dioctyl Tin diricinoleate
[4]Isocyanate available from Cas Chem Co.

Samples of the polyol first component and the isocyanate second component are force aged for six weeks at 60° C. to evaluate the shelf life of the first and second components. Polyurethanes formed from samples of both the unaged and aged polyol and isocyanate components are evaluated. The results of this evaluation, as shown in the Table below, surprisingly indicates that the properties of the urethanes formed from the aged components are substantially unchanged from the properties of the urethanes formed from the unaged samples.

|  | Unaged | Aged |
| --- | --- | --- |
| GEL | 9.2 minutes | 9.4 minutes |
| Hydroxyl Value | 260 | 251 |
| Acid Value | 1.8 | 2.4 |
| Hardness |  |  |
| Di[1] | 38 | 48 |
| D10[2] | 26 | 29 |
| Potted Adhesion | Excellent | Excellent |
| Flexibility | Excellent | Excellent |
| Overall Rating | 3 | 3 |

[1]Instantaneous Shore D hardness, 50 gram hardness cube.
[2]Ten second Shore D hardness, 50 gram hardness cube.

The urethanes formed from both the aged and the unaged components are used to pot the hollow fibers in a biomedical separatory device. The hollow fiber separating device includes a plurality hollow fibers contain large amounts of glycerine. The hollow fibers have end portions which are potted in a tube sheet and whose open fiber ends terminate in a tube sheet face. The resulting bundle is sealed within a casing to form a separatory cell that has two or more fluid ports which enable passage of one fluid through the fibers and another fluid around the fibers without mixing of the fluids.

The tube sheet is the reaction product of a first polyol component and a second isocyanate component. The polyol component has at least eight carbon atoms and includes the amine of Formula I. The polyol component has an equivalent weight of 60–275. Potting is accomplished by a centrifugal casting technique as described in U.S. Pat. Nos. 3,228,876 and 3,962,094. The potted area is cut into slices at right angles to reveal the open ends of the fiber tubes. These slices are immersed into water for 1 minutes. The method of evaluation is as follows: The potted section is examined visually using a microscope if necessary. Following criteria are used to determine the quality of the polyurethane potting compounds.

Flexibility—The cut slices are gently flexed repeatedly by hand until the slices break. This breakage usually occurs along the boundary of the polyurethane fibers. If the slice breaks apart after flexing more than twice, it is classified as borderline, (designated in the tables as "some"). If the slice breaks during the first flexing, its flexibility rating is poor. If it tolerates more than five flexings, the flexibility rating is good, while if it tolerates more than 10 flexings, the flexibility rating is excellent.

Adhesion to Fiber—No fiber should be disounded from the polyurethane in actual applications. Thus, the cut slices are torn apart intentionally to determine where breakage occurs. If the slice breaks apart within the polyurethane area, the adhesion rating is excellent. If the slice breaks apart along the boundary of polyurethane and fibers and within the polyurethane area with some resistance to the applied force, the adhesion rating is good. If the slice breaks apart along the boundary of the polyurethane and fibers with some resistance thereto, the rating is "some" adhesion. If the slice breaks apart easily, along the boundary of the polyurethane fibers, the adhesion rating is poor. If fibers separate from the polyurethane easily by hand, the adhesion rating is poor even if the splice itself is difficult to break.

Overall Ratings—3 is assigned if a polyurethane compound exhibits good to excellent flexibility, with good to excellent adhesion. 2 is assigned if the flexibility is borderline with at least "some" adhesion. 1 is assigned if the flexibility and/or the adhesion are poor. 2 and 3 indicate formulations which provide acceptable performance. The results of potting indicate that urethanes from both the aged and unaged components yielded excellent adhesion to both the fibers and the casing. The fibers retained and excellent open pore structure, and the hollow fibers retained an open, round structure free of visible cracks.

What is claimed is:

1. A two component composition for providing polyurethanes comprising,
a polyol first component comprising non-amine hydroxy-functional organic materials, and an amine of Formula (I):

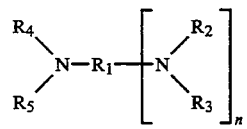

where
$R_1 = C_1-C_{10}$ alkyl,
$R_4 = C_8-C_{25}$ alkyl,
$R_2$, $R_3$, and $R_5$ are independently a $C_1-C_{10}$ alkanol, $C_2-C_{10}$ alkenol and n=1 or 2, and a second component of an isocyanate that has at least two (—NCO) groups per molecule of isocyanate.

2. The composition of claim 1 wherein said non-amine hydroxy functional materials are carboxylic acid esters wherein said ester has at least eight carbons and a hydroxyl functionality greater than two.

3. The composition of claim 2 wherein said carboxylic acid esters are selected from the group of castor oil derivatives and ricinoleic acid derivatives.

4. The composition of claim 1 wherein said amine is less than 30% by weight of said first components.

5. The composition of claim 4 wherein said amine is 0.1 to 10% of said first component.

6. The composition of claim 5 wherein said amine is 3% of said first component.

7. The composition of claim 6 wherein said ester is an ester of Castor Oil and said isocyanate is a diisocyanate.

8. The composition of claim 2 wherein in said amine, $R_1 = C_1-C_8$ alkyl, and $R_4 = C_{10}-C_{20}$ alkyl.

9. The composition of claim 4 wherein in said amine, $R_1 = C_3$ alkyl, $R_4 = C_{18}$ alkyl, and $R_2$, $R_3$ and $R_5$ are each independently $CH_3CH_2OH$.

10. The composition of claim 7 wherein in said amine $n=1$, and said amine is a tertiary amine.

11. A hollow fiber separatory device capable of use in biomedical applications comprising a hollow fiber bundle having a plurality of hollow fibers whose end portions are potted in a tube-sheet and whose open fiber ends terminate in a tube-sheet face, the resulting bundle being sealed within a casing to form a separatory cell having two or more fluid ports which enable passage of one fluid through the fibers and another fluid around the fibers without mixing of said fluids, said tube-sheet comprising the reaction product of a first component comprising a non-amine hydroxy functional organic material having an equivalent weight of between 60 and 275 and an amine of Formula (I):

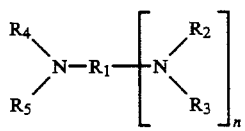

wherein:
$R_1 = C_1 - C_{10}$ alkyl
$R_4 = C_8 - C_{25}$ alkyl,
$R_2$, $R_3$, and $R_5$ are independently are $C_1 - C_{10}$ alkanol, $C_2 - C_{10}$ alkenol,
$n=1$ or 2 and a second component comprising an organic isocyanate that has at least two (—NCO) groups per molecule of isocyanate.

12. The device of claim 11 wherein said non-amine hydroxy functional materials are carboxylic acid esters wherein said ester has at least eight carbons and a hydroxyl functionality greater than two.

13. The device of claim 12 wherein said carboxylic acid ester is selected from the group of castor oil derivatives, and esters of ricinoleic acid.

14. The device of claim 11 wherein said amine is less than 30% by weight of said first components.

15. The device of claim 12 wherein said amine is 0.1 to 10% of said first component.

16. The device of claim 15 wherein said amine is 3% of said first component.

17. The device of claim 14 wherein in said amine, $R_1 = C_1 - C_8$ alkyl, and $R_4 = C_{10} - C_{20}$ alkyl.

18. The device of claim 15 wherein in said amine $R_1 = C_3$ alkyl, $R_4 = C_{18}$ alkyl, and $R_2$, $R_3$ and $R_5$ are each independently $CH_3CH_2OH$.

19. The device of claim 16 wherein in said amine $n=1$, and said amine is a tertiary amine.

20. The composition of claim 1 wherein said amine consists essentially of said Formula (I).

21. The device of claim 11 wherein said amine consists essentially of said Formula (I).

* * * * *